Jan. 26, 1965      W. K. EDELBÖCK      3,167,246
PARTIAL PRODUCT MULTIPLYING MACHINE

Filed April 16, 1963      2 Sheets-Sheet 1

United States Patent Office 3,167,246
Patented Jan. 26, 1965

3,167,246
PARTIAL PRODUCT MULTIPLYING MACHINE
Wilhelm K. Edelböck, Rotenfels, Baden, Germany, assignor to Ing. C. Olivetti & C., S.p.A., Ivrea, Italy, a corporation of Italy
Filed Apr. 16, 1963, Ser. No. 273,435
Claims priority, application Austria, Apr. 24, 1962, A 3,333/62
9 Claims. (Cl. 235—61)

This invention relates to a partial product multiplying machine having a transversely stationary multiorder register, a set of movable partial product plates corresponding to the various multiplicand digits, a multiorder multiplicand indexing device transversely shiftable step by step and provided in each order with a connecting member differentially settable according to the corresponding multiplicand digit and adapted to connect the corresponding partial product plate to the register order corresponding to the order of said connecting member, and a plurality of moving members individually selectable according to the digit of each multiplier order for simultaneously moving said partial product plates to differentially actuate the register orders connected thereto by the intermediary of said connecting members.

In a known multiplying machine of the above type the moving members are selected each time by depressing a corresponding numeral key, whereby multiplication by a multiorder multiplier is effected intermittently and requires a continuous attention from the user.

Partial product multiplying machines, wherein both a multiorder multiplicand and a multiorder multiplier are set-up before starting the multiplication, are known as well. In a multiplying machine of this type multiplicand and multiplier are stored in two transversely stationary indexing devices. The machine is provided with a set of control members which must be sequentially controlled for sensing the various multiplier orders. Therefore on one hand the machines are very intricate and expensive to manufacture, and on the other hand said indexing devices cannot be set up directly through a ten key keyboard.

In another known multiplying machine, the multiplicand and the multiplier are set-up in two different set-up carriages by means of two different ten key keyboards. This machine is provided with a number of partial product plates equal to the product of the number of available multiplicand orders by the number of available multiplier orders, each plate reproducing all the products of each multiplicand digit by each multiplier digit. The machine thus results very encumbering and with a limited capacity.

At last in another known multiplying machine the multiplicand and the multiplier are set-up in two different set-up carriages through a single ten key keyboard. The two carriages control the position of disks provided with a large number of electric contacts, whereby the resulting machine is rather unreliable in operation.

The primary object of the invention is to provide a partial product multiplying machine obviating all the above disadvantages.

An object is also to provide an improved multiplying machine wherein multiplicand and multiplier are settable by means of a single ten key keyboard.

Another object is to provide a multiplying machine wherein the partial product represented by the plates are accumulated into the register through a very simple motion transmission.

A further object is to provide a partial product multiplying machine adapted to be provided with a device for printing the factors as well as the products.

According to the invention in a multiplying machine of the type first referred to above, I now provide a multiplier indexing device transversely shiftable step by step and provided in each order with an element settable according to the corresponding multiplier digit, a single ten key keyboard for setting both said connecting members and said elements, means sequentially conditionable by said elements for individually selecting said moving members, and means operable during multiplication of stepwise shifting said indexing devices.

Other objects, features and advantages of the invention will become apparent from the following description of a preferred embodiment thereof, made by way of example and not in a limiting sense, with reference to the accompanying drawings, wherein.

Figure 2:
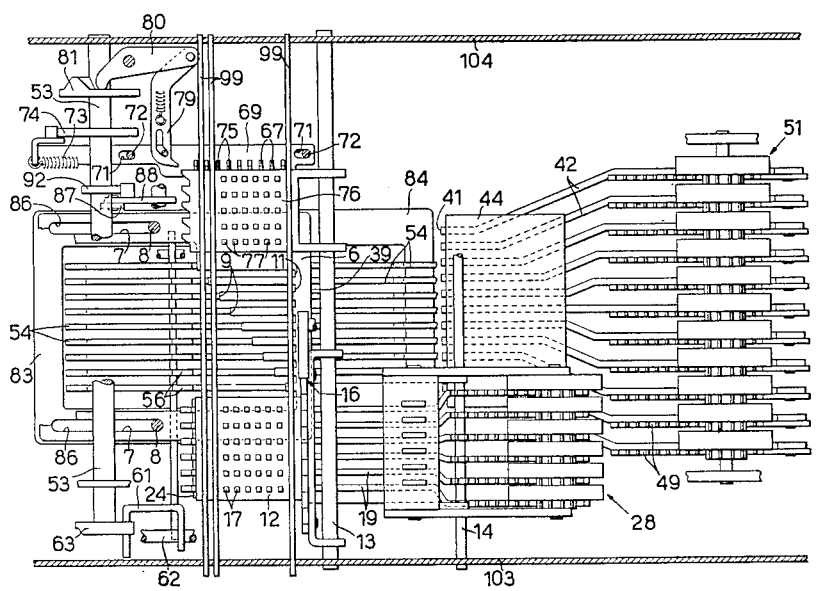
FIG. 2 is a partial plan view of the multiplying machine of FIG. 1.

With reference to the drawings, the numeral 6 indicates each one of a set of movable partial product plates corresponding to the various multiplicand digits. More particularly, there are nine horizontal plates 6 arranged one upon the other and each one provided with a pair of slots 7 (FIG. 2) longitudinally slidable on two stationary shafts 8. Each plate 6 represents in a known manner the partial products of the corresponding multiplicand digit by the multiplier digits from one to nine. More particularly, the forward edge of each plate 6 (leftward in FIG. 2) is provided with a first plurality of nine shoulders 9 representing the units of said partial products and interspersed with a second plurality of nine shoulders 11 representing the tens of said partial products. The plate 6 shown in FIG. 2 is the first one from the top and corresponds to the multiplicand digit one.

The machine comprises a multiorder multiplicand indexing device transversely shiftable step by step and formed of a stop pin carriage 12 slidable along a pair of stationary shafts 13 and 14. The carriage 12 is adapted to be stepwise advanced leftwards under the control of an escapement mechanism known per se and generically indicated with the numeral 16, and is provided in each order with nine settable stop pins 17. Furthermore, each order of the carriage 12 is provided with a horizontal slide 19 slidably mounted by means of a slot 21 (FIG. 1) on a shaft 22 secured to the carriage 12. The slides 19 are normally urged by a spring 23 to contact a stationary bar 24 (FIG. 2) located under the carriage 12 when at rest. Each slide 19 is provided with a projection 26 (FIG. 1) adapted to be arrested by a set stop pin 17 of the corresponding order and with a toothed portion 27 engaging a corresponding pinion of a dial 28 to show the set-up multiplicand.

Furthermore, each slide 19 is associated with a vertical slide 34 guided by two transverse comb plates 36 secured to the carriage 12 and urged by a spring 32 to normally contact by means of a pin 33 a tapered edge 31 of the slide 19. The lower end of each slide 34 is provided with a hub 37 mounting a connecting member differentially settable according to the corresponding multiplicand digit and formed of a longitudinally slidable interponent or rod 38. The forward end of each rod 38 is adapted to cooperate with a rectilinear edge 39 (FIG. 2) of the plates 6, whereas the rearward end thereof is adapted to cooperate with a vertical edge 41 (FIG. 1) of a number of differentially reciprocable actuators 42.

Each actuator 42 is provided with a pair of projections 43 slidably mounted in a notch of a pair of stationary plates 44 and with a slot 46 slidably mounted on a stationary shaft 47. A spring 48 normally urges the corresponding actuator 42 to contact by means of the rearward end of the slot 46 the shaft 47. Pivoted on each actuator 42 is a rack 49 normally engaging a transversely stationary multiorder register 51 under the control of a bail 52. The bail 52 is operable by a cyclically operating mechanism comprising a main operating shaft 53, adapted to effect at each machine cycle one revolution of 360° in a manner known per se.

It will thus be clear that each connecting member 38 is adapted to connect the corresponding partial product plate 6 with the register order corresponding to the order of said connecting member 38.

The register 51 is adapted to cooperate with a suitable tens transfer device and with a suitable register clearing device, each of both said devices being known per se.

Furthermore, the multiplying machine comprises a plurality of moving members or slides 54 individually selectable according to the digit of each multiplier order for simultaneously moving the partial product plates 6 to differentially reciprocate the actuators 42 through the rods 38 according to the encountered shoulders 9 or 11. More particularly, there are nine slides 54 each one provided with a projection 56 normally located in front of the shoulder 9 of the plates 6 (FIG. 2) representing the partial product by the corresponding multiplier digit.

The slides 54 (FIG. 1) are slidably mounted in the notches of a stationary comb plate 57 and of a second comb plate 58 (FIG. 3) transversely slidable for causing the projections 56 to alternately engage the shoulders 9 (FIG. 2) and the shoulders 11 of the plates 6. To this end the left-hand end of the comb plate 58 (FIG. 3) is provided with a slot 59 slidable on a stationary pin 60, whereas the right-hand end thereof is pivoted on a bail 61 fulcrumed at 62. The bail 61 is normally urged by a spring 64 to frontally contact a cam 63 of the main shaft 53.

Each slide 54 (FIG. 1) is normally urged by a spring 65 to longitudinally contact the comb plate 57 and to vertically contact a projection 66 of a corresponding lever 67 (FIG. 3) fulcrumed at 68. In turn the levers 67 normally contact a comb plate 69 slidably mounted by means of a pair of slots 71 (FIG. 2) on a pair of stationary pins 72 and normally urged by a spring 73 to contact a cam 74 of the main shaft 53.

The multiplying machine also comprises a multiorder multiplier indexing device transversely shiftable step by step and provided in each order with an element settable according to the corresponding multiplier digit. More particularly, the multiplier indexing device is formed of a stop pin carriage 76 slidably mounted on the transverse shaft 13 and adapted to be stepwise shifted leftwards under the control of an escapement mechanism known per se and not disclosed here. The carriage 76 is provided in each order with a plurality of stop pins 77 individually settable for cooperating with an upper end 75 (FIG. 3) of each lever 67. The ends 75 of the levers 67 are normally located leftwards with respect to the carriage 76 and are interspersed with the rows of stop pins 77 (FIG. 2), whereby during the leftward stepwise movement of the carriage 76 the levers 67 are not affected by the set-up stop pins 77. The carriage 76 is further adapted to be back spaced by a pawl 79 operable by a cam 81 of the main shaft 53 through a lever 80.

The forward end 82 (FIG. 1) of each slide 54 is adapted to be placed on the path of a forward cross bar 83 of a horizontal plate 84 slidably mounted by means of a pair of slots 86 (FIG. 2) on the shafts 8. The plate 84 is provided with a lug 87 (FIG. 1) pin-and-slot connected with a lever 88 pivoted at 89 and normally urged by a spring 91 to contact a cam 92 of the main shaft 53. The cam 92 is provided with two equal portions, whereby it is adapted to reciprocate the plate 84 twice during a cycle of the shaft 53. A rearward cross bar 93 of the plate 84 is located behind a projection 94 of the slide 54.

The two carriages 12 and 76 (FIG. 3) are adapted to be set-up by means of a single ten key keyboard. More particularly, each key 96 of the keyboard is provided with a corresponding key lever contained into a box 97 and comprising a projection 98 protruding downwards from the box 97. Each projection 98 (FIG. 1) may cooperate with a corresponding setting member 99 having a pair of lengthwise distanced projections 101 and 102 (FIG. 3) each one adapted to set-up a corresponding stop pin 17 and 77 of the two carriages 12 and 76, respectively.

Figure 3:
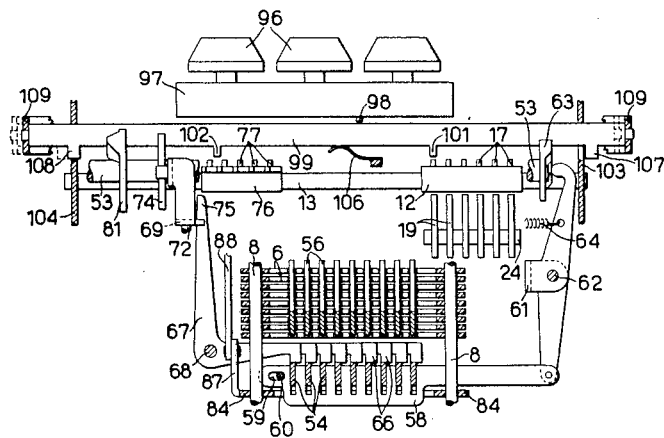
FIG. 3 is a frontal partial sectional view of the machine taken on the line III—III of FIG. 1.

The setting members 99 are mounted on a support 109 and are slidable in a pair of stationary comb plates 103 and 104 each setting member being normally urged upwards by a corresponding leaf spring 106. Each setting member 99 is provided with a pair of fulcrum elements transversely distanced apart and selectable for causing said setting members to set-up either the stop pins 17 or the stop pins 77. More particularly, each one of said fulcrum elements comprises a projection 107, and 108 respectively, formed at the two ends of each setting member 99 and adapted to alternately cooperate with the two comb plates 103 and 104, respectively. To this end the setting members 99 are adapted to be bodily shifted lengthwise. In FIG. 3 the setting members 99 are in their right hand end position and the projections 101 are in a position effective for engaging the stop pins 17 of the multiplicand set-up carriage 12, whereas the projections 102 are in a position ineffective for engaging the stop pin 77 of the multiplier set-up carriage 76.

The multiplying machine operates as follows.

At first the multiplicand is set up by means of the single ten key keyboard. Upon depression of a key 96, the projection 98 of its key lever engages the corresponding setting member 99 which by means of its projection 108 pivots about the comb plate 104 and rocks clockwise, whereby the projection 101 sets up a stop pin 17 of the carriage 12, whereas the projection 102 remains ineffective. Furthermore, the escapement mechanism 16 (FIG. 2) is operated, whereby the carriage 12 is shifted one step leftwards. Now the carriage 12 releases the first left-hand slide 19 from engagement with the bar 24, whereby the spring 23 (FIG. 1) moves the slide 19 rearwards until arrested through its projection 26 by the stop pin 17 set up in the corresponding order of the carriage 12. The slide 19 by means of its toothed portion 27 rotates the corresponding wheel of the dial 28, whereas its inclined edge 31 enables the spring 32 to move the vertical slide 34 downwards through a corresponding stroke. The slide 34 thus locates its rod 38 on the horizontal plane of the plate 6 corresponding to the multiplicand digit set up. The subsequent multiplicand orders are set up in a similar manner.

A conventional multiplier set-up key not shown in the drawings is now depressed. This key by means known per se transversely shifts the support 109 to bodily shift the setting members 99 leftwards into the position shown by broken lines in FIG. 3. The setting members 99 thus displace their projections 102 to a position effective for engaging the stop pins 77 of the multiplier set-up carriage 76 and their projections 107 above the comb plate 103, whereas the projections 101 are displaced to a position ineffective for engaging the stop pins 17 of the multiplicand set-up carriage 12. The multiplier is now set up by means of the same ten key keyboard 96. Upon the depression of a key 96, the projection 98 of its key lever depresses the setting member 99, which by means of its projection 107 pivots now counterclockwise about the comb plate 103, whereby the projection 102 sets up a stop-pin 77 of the carriage 76. Furthermore, the escapement mechanism of the carriage 76 is operated, whereby the carriage 76 is shifted one step leftwards. The subsequent multiplier orders are set up in a similar manner.

After both the multiplicand and the multiplier have been set up a conventional multiplication key, not shown in the drawings, is depressed. This multiplication key starts in a known manner the cyclical operation of the main shaft 53. At the beginning of each cycle of the main shaft 53, the cam 74 (FIG. 1) enables the comb plate 69 to be shifted rearwards by the spring 73 to displace the upper ends 75 of the levers 67 into the path of the set-up stop pins 77 of the carriage 76.

Now the cam 81 through the lever 80 operates the pawl 79 (FIG. 2) to back space the carriage 76. The last set-up stop pin 77 of the carriage 76, corresponding to the digit of the lowest multiplier order, now engages the upper end 75 (FIG. 3) of the corresponding lever 67 which is thus rocked clockwise. The projection 66 of this lever 67 then depresses the corresponding slide 54, which thus locates its end 82 (FIG. 1) into the path of the cross bar 83 of the plate 84, whereby this slide 54 is selected for operation.

Now the cam 92 rocks the lever 88 counterclockwise, whereby the plate 84 effects its first stroke toward the rear of the machine. In turn the cross bar 83 of the plate 84 moves the depressed slide 54, whose projection 55 engages the corresponding shoulder 9 of each plate 6. The plates 6 are thus simultaneously moved rearwards through strokes corresponding to the units of the partial products by the digit of the lowest multiplier order. In turn each plate 6 moves rearwards all the rods 38 (FIG. 1) which have been placed on its horizontal plane, whereby the actuators 42 corresponding to the various rods 38 are displaced through a substantially rectangular motion transmission. The actuators 42 through the racks 49 will thus enter the units of the partial products into the register 51.

The bail 52 is then rocked counterclockwise in a known manner, whereby the racks 49 disengage the register 51. Thereafter the cam 92 enables the lever 88 to be returned clockwise by the spring 91. The plate 84 is thus returned forwards and through its cross bar 93 engages the projection 94 of the slide 54 previously moved for restoring same. The actuators 42 are now restored by their springs 48 and through their edge 41 they restore the rods 38 and the plates 6. During this restoring stroke of the plate 84, the conventional tens transfer device of the register 51 is operated in a manner known per se.

Near the middle of the cycle, the main shaft 53 by means of a cam not shown in the drawings operates in a known manner the escapement device 16 (FIG. 2) of the multiplicand set-up carriage 12, which is thus shifted one step leftwards. The bail 52 (FIG. 1) then causes the racks 49 to reengage the register 51. Thereupon the cam 63 (FIG. 3) enables the bail 61 to be rocked counterclockwise by the spring 64. The bail 61 through the comb plate 58 shifts the slides 54 rightwards, whereby their projections 56 are displaced in front of the shoulders 11 (FIG. 2) of the plates 6. It is to be noted that the projections 66 (FIG. 3) of the levers 67 are long enough to remain in contact with the slides 54 even after the above displacement, whereby the selected slide 54 remains in its lower position.

Now the cam 92 (FIG. 1) again rocks the lever 88 counterclockwise, whereby the plate 84 effects its second stroke toward the rear of the machine. The cross bar 83 then moves rearwards the selected slide 54, whose projection 56 engages the corresponding shoulder 11 (FIG. 2) of each plate 6. The plates 6 are thus moved rearwards through strokes corresponding to the tens of the partial products, which are entered into the register 51 (FIG. 1), through the rods 38, the actuators 42 and the racks 49. Thereafter the cam 92 enables the actuators 42, the plates 6 and the selected slide 54 to be restored in a manner similar to that described hereinbefore.

Figure 1:
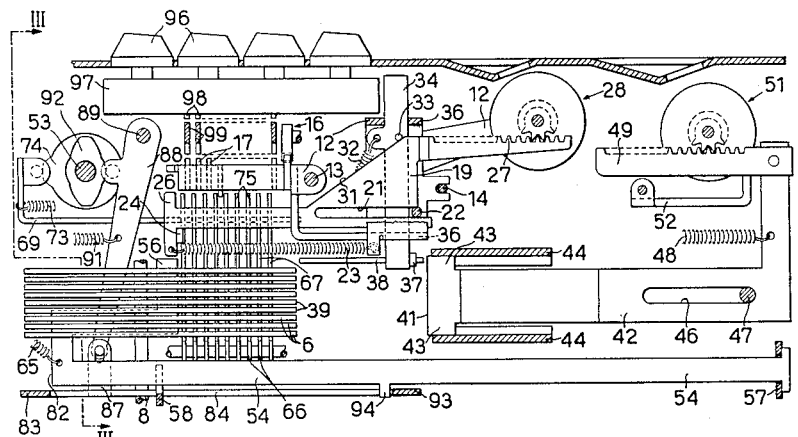
FIG. 1 is a right hand longitudinal partial sectional view of a partial product multiplying machine according to the invention.

At the end of the machine cycle the cam 74 restores the comb plate 69, which thus restores the upper ends 75 of the levers 67 to their positions interspersed with the stop pins 77 of the carriage 76. The rocked lever 67 (FIG. 3) may then be restored, together with the selected slide 54, by the spring 65 (FIG. 1). Furthermore, the cam 63 (FIG. 3) restores the bail 61 which through the comb plate 58 returns the slides 54 in front of the shoulders 9 (FIG. 2) of the plates 6. The machine cycles are effected in a similar manner for the subsequent multiplier orders.

At the end of the multiplication cycle relating to the highest multiplier order, a device known per se causes the carriage 12 to be restored rightwards and to clear the multiplicand set-up therein. Thereafter the machine is automatically stopped.

It will be clear that the single ten key keyboard 96 is adapted to set both the connecting members 38 and the elements 77 and that means 67 are sequentially conditionable by said elements for individually selecting the moving members 54, means 16, 79 being operable during multiplication for stepwise shifting the indexing devices 12 and 76.

It is to be understood that modifications, improvements and addition of parts may be made in the described multiplying machine without departing from the scope of the invention. For example, the two slides 19 and 34 of each order of the carriage 12 may be replaced by a single member provided with both the projection 26 and the rod 38. Furthermore, the multiplying machine may be provided with a printing device controlled by the reciprocable actuators 42 as well as by both the set-up carriages 12 and 76. The register 51 and the racks 49 may be engaged and disengaged by shifting the register instead of the racks. Finally, each one of the carriages 12 and 76 may be provided with a selectively operable clearing device, whereby in a series of multiplications having a constant factor either the multiplicand or the multiplier may be used as a constant factor.

What I claim is:

1. In a multiplying machine having a transversely stationary multiorder register, and a set of movable partial product plates corresponding to the various multiplicand digits, the combination of:
    (a) a multiorder multiplicand indexing device transversely shiftable step by step and provided in each order with a connecting member differentially settable according to the corresponding multiplicand digit and adapted to connect the corresponding partial product plate to the register order corresponding to the order of said connecting members,
    (b) a plurality of moving members individually selectable according to the digit of each multiplier order for simultaneously moving said partial product plates to differentially actuate the register orders connected thereto by the intermediary of said connecting members,
    (c) a multiorder multiplier indexing device transversely shiftable step by step and provided in each order with an element settable according to the corresponding multiplier digit,
    (d) a single ten key keyboard for setting said connecting members and said elements,
    (e) means sequentially conditionable by said elements for individually selecting said moving members,
    (f) and means operable during multiplication for stepwise shifting said indexing devices.

2. In a multiplying machine having a transversely stationary multiorder register, and a set of movable partial product plates corresponding to the various multiplicand digits, the combination of:
    (a) a multiorder multiplicand indexing device transversely shiftable step by step and provided in each order with a connecting member differentially settable according to the corresponding multiplicand digit and adapted to connect the corresponding partial product plate to the register order corresponding to the order of said connecting members,
    (b) a plurality of moving members individually selectable according to the digit of each multiplier order for simultaneously moving said partial product plates to differentially actuate the register orders connected thereto by the intermediary of said connecting members, (c) a multiorder multiplier indexing device transversely shiftable step by step and provided in each order with an element settable according to the corresponding multiplier digit, (d) a single ten key keyboard for setting said connecting members and said elements, (e) means operable during multiplication for stepwise shifting said multiplicand indexing device in one direction, (f) means operable during multiplication for stepwise shifting said multiplier indexing device in a direction opposite to said one direction, (g) and means sequentially conditionable by said elements upon shifting of said multiplier indexing device in said opposite direction for individually selecting said moving members.

3. In a multiplying machine having a transversely stationary multiorder register, and a set of movable partial product plates corresponding to the various multiplicand digits, the combination of:

(a) a multiorder multiplicand indexing device transversely shiftable step by step and provided in each order with a connecting member differentially settable according to the corresponding multiplicand digit and adapted to connect the corresponding partial product plate to the register order corresponding to the order of said connecting members, (b) a plurality of moving members individually selectable according to the digit of each multiplier order for simultaneously moving said partial product plates to differentially actuate the register orders connected thereto by the intermediary of said connecting members, (c) a multiorder multiplier indexing device transversely shiftable step by step and provided in each order with a plurality of stop pins individually settable according to the corresponding multiplier digit, (d) a single ten key keyboard for setting said connecting members and said stop pins, (e) means operable during multiplication for stepwise shifting said multiplicand indexing device in one direction, (f) means operable during multiplication for stepwise shifting said multiplier indexing device in a direction opposite to said one direction, (g) and a plurality of sensing members adapted to sequentially sense said set stop pins upon shifting of said multiplier indexing device in said opposite direction for individually selecting said moving members.

4. In a multiplying machine having a transversely stationary multiorder register, and a set of movable partial product plates corresponding to the various multiplicand digits, the combination of:

(a) a multiorder multiplicand indexing device transversely shiftable step by step and provided in each other with a connecting member differentially settable according to the corresponding multiplicand digit and adapted to connect the corresponding partial product plate to the register order corresponding to the order of said connecting member, (b) plurality of moving members individually selectable according to the digit of each multiplier order for simultaneously moving said partial product plates to differentially actuate the register orders connected thereto by the intermediary of said connecting members.

(c) a multiorder multiplier indexing device transversely shiftable step by step and provided in each order with a plurality of stop pins individually settable according to the corresponding multiplier digit, (d) a single ten key keyboard for setting said connecting members and said stop pins, (e) means operable during multiplication for stepwise shifting said multiplicand indexing device toward the higher orders, (f) means operable during multiplication for stepwise shifting said multiplier indexing device toward the lower orders, (g) a plurality of sensing members engageable by said set stop pins for individually selecting said moving members, said sensing members being normally located out of the path of said set stop pins, (h) and means cyclically operable for shifting said sensing members into said path.

5. In a multiplying machine having a transversely stationary multiorder register, and a set of movable partial product plates corresponding to the various multiplicand digits, the combination of:

(a) a number of differentially reciprocable actuators for said register, (b) a multiorder multiplicand indexing device transversely shiftable step by step and provided in each order with a set of stop pins individually settable according to the corresponding multiplicand digit and with an interponent movable in a first direction, said interponent being adapted to be variably arrested by the set stop pin of its order for being interposed between the corresponding partial product plate and the actuator corresponding to the order of said interponent, said interponent being further slidably mounted in a second direction, (c) a plurality of moving members individually selectable according to the digit of each multiplier order for simultaneously moving said partial product plates to differentially reciprocate said actuators by the intermediary of said interponents, said partial product plates, interponents and actuators being mounted for substantially rectilinear movement along said second direction, (d) a multiorder multiplier indexing device transversely shiftable step by step and provided in each order with an element settable according to the corresponding multiplier digit, (e) a single ten key keyboard for setting both said interponents and said elements, (f) means sequentially conditionable by said elements for individually selecting said moving members, (g) and means operable during multiplication for stepwise shifting said indexing devices.

6. In a multiplying machine having a transversely stationary multiorder register, and a set of movable partial product plates corresponding to the various multiplicand digits, the combination of:

(a) a number of differentially reciprocable actuators for said register, (b) a multiorder multiplicand indexing device transversely shiftable step by step and provided in each order with a set of stop pins individually settable according to the corresponding multiplicand digit and with an interponent movable in a first direction, said interponent being adapted to be variably arrested by the set stop pin of its order for being interposed between the corresponding partial product plate and the actuator corresponding to the order of said interponent, said interponent being further slidably mounted in a second direction, (c) a set of moving members individually selectable according to the digit of each multiplier order for simultaneously moving said partial product plates to differentially reciprocate said actuators by the intermediary of said interponents, said partial product plates, interponents and actuators being amounted for substantially rectilinear movement along said second direction, (d) a multiorder indexing device transversely shiftable step by step and provided in each order with a set of stop pins individually settable according to the corresponding multiplier digit, (e) a single ten key keyboard, (f) a set of elongated setting members each one operable by said keyboard and having a pair of lengthwise distanced projections, one associated with the stop pins of said multiplicand indexing device and the other associated with the stop pins of said multiplier indexing device, (g) a pair of fulcrum elements for said setting members, said fulcrum elements being distanced apart and selectable for enabling the corresponding setting member to pivot about either one of said fulcrum elements and either one of said projections to set the associated stop pins, (h) means sequentially conditionable by the stop pins of said multiplier indexing device for individually selecting said moving members, (i) and means operable during multiplication for stepwise shifting said indexing devices.

7. In a multiplying machine having a multiplicand stop pin carriage, a multiplier stop pin carriage, and a single ten key keyboard for said stop pin carriages, the subcombination of:

(a) a set of elongated setting members each one operable by said keyboard and having a pair of lengthwise distanced projections, one associated with the stop pins of said multiplicand stop pin carriage and the other associated with the stop pins of said multiplier stop pin carriage, (b) a pair of fulcrum elements for each one of said setting members, said fulcrum elements being distanced apart and selectable for enabling the corresponding setting member to pivot about either one of said fulcrum elements and either one of said projections to set the associated stop pins, (c) and means for bodily lengthwise shifting said setting members for selecting said fulcrum elements.

8. In a multiplying machine having a transversely stationary multiorder register, and a set of movable partial product plates corresponding to the various multiplicand digits and each one provided for each multiplier digit with a first shoulder representing the units and with a second shoulder representing the tens of the corresponding partial product, the combination of:

(a) a multiorder multiplicand indexing device transversely shiftable step by step and provided in each order with a connecting member differentially settable according to the corresponding multiplicand digit and adapted to connect the corresponding partial product plate to the register order corresponding to the order of said connecting member, (b) a plurality of moving members individually selectable according to the digit of each multiplier order and adapted to alternately engage said first and second shoulder for simultaneously moving said partial product plates to differentially actuate the register orders connected thereto by the intermediary of said connecting members, (c) a multiorder multiplier indexing device transversely shiftable step by step and provided in each order with an element settable according to the corresponding multiplier digit, (d) a single ten key keyboard for setting said connecting members and said elements, (e) means sequentially conditionable by said elements for individually selecting said moving members, (f) and means operable during multiplication for stepwise shifting said indexing devices.

9. In a multiplying machine having a transversely stationary multiorder register, and a set of movable partial product plates corresponding to the various multiplicand digits and each one provided for each multiplier digit with a first shoulder representing the units and with a second shoulder representing the tens of the corresponding partial product, the combination of:

(a) a multiorder multiplicand indexing device transversely shiftable step by step and provided in each order with a connecting member differentially settable according to the corresponding multiplicand digit and adapted to connect the corresponding partial product plate to the register order corresponding to the order of said connecting member, (b) a plurality of moving member individually selectable according to the digit of each multiplier order, (c) the selected moving member being operable by said cyclically operating mechanism twice in a cycle for simultaneously moving said partial product plates to differentially actuate the register orders connected therto by the intermediary of said connecting members, (d) means for causing said moving members to alternately engage said first and said second shoulder in said cycle, (e) a multiorder multiplier indexing device transversely shiftable step by step and provided in each order with an element settable according to the corresponding multiplier digit, (f) a single ten key keyboard for setting said connecting members and said elements, (g) cyclically operable means for stepwise shifting said multiplicand indexing device toward the higher orders upon engagement of said moving members with said second shoulder, (h) cyclically operable means for stepwise shifting said multiplier indexing device toward the lower orders upon engagement of said moving members with said first shoulder, (i) and means sequentially conditionable by said elements for individually selecting said moving members.

References Cited by the Examiner

UNITED STATES PATENTS

| | | | |
|---|---|---|---|
| 1,302,250 | 4/19 | Von Reppert | 235—61 |
| 1,958,515 | 5/34 | Isherwood | 235—61 |
| 2,379,449 | 7/45 | Mehan | 235—61 |
| 2,467,419 | 4/49 | Avery | 235—61 |
| 2,905,382 | 9/59 | Carnacina | 235—60 |

LEO SMILOW, *Primary Examiner.*